T. F. CARLISLE.
WIRE FOR ORNAMENTAL CHAINS.
APPLICATION FILED MAR. 16, 1910.

978,847.

Patented Dec. 20, 1910.

WITNESSES
Alfred H. Whatley
George H. McLaughlin.

INVENTOR
Thomas F. Carlisle
BY Horatio E. Bellows
ATTORNEY

UNITED STATES PATENT OFFICE.

THOMAS F. CARLISLE, OF PROVIDENCE, RHODE ISLAND, ASSIGNOR TO THE IMPROVED SEAMLESS WIRE COMPANY, A CORPORATION OF RHODE ISLAND.

WIRE FOR ORNAMENTAL CHAINS.

978,847.         Specification of Letters Patent.         Patented Dec. 20, 1910.

Application filed March 16, 1910. Serial No. 549,604.

*To all whom it may concern:*

Be it known that I, THOMAS F. CARLISLE, a citizen of the United States, residing at Providence, in the county of Providence and State of Rhode Island, have invented certain new and useful Improvements in Wire for Ornamental Chains, of which the following is a specification.

My invention relates to wire plated with a precious metal intended for use in articles of jewelry formed by uniting abutting surfaces by means of the fusion of inclosed solder, such as chain links. This type of wire is commonly known as solder-filled wire.

Links for ornamental chains are formed by cutting a wire blank into short lengths, bending each link into circular form, and uniting the abutting ends by solder. To effect the soldering operation it is customary to insert into the center of a precious metal plated ingot, intended for reduction into wire, a core or plug of solder extending longitudinally throughout the ingot. The ingot is then reduced by swaging machines, rolls, or both, to wire of the diameter desired for the link. During the reducing step the solder of the plug is transversely fractured creating spaces or intervals with little or no solder in the completed wire. When such a space or interval is present at or near the abutting ends of the link blank there is not a sufficient flow of solder to unite the ends. Furthermore the central solder core occupies so great a portion of the area of the abutting faces that only a small annular surface remains upon each face available to receive the solder and that annular surface is exclusively near the periphery of the abutting face where its presence in quantities is not desirable.

It is the essential purpose of my invention to produce a wire of the described type which shall possess none of the enumerated disadvantages.

My invention consists in the construction and combination of the parts set forth in and falling within the scope of the claim hereto appended.

Figure 1:
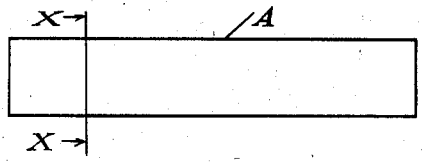
Figure 4:
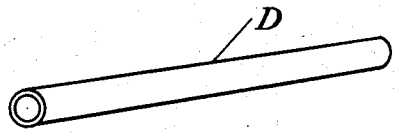
Figure 2:
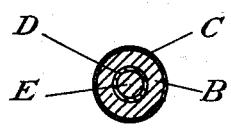
Figure 5:
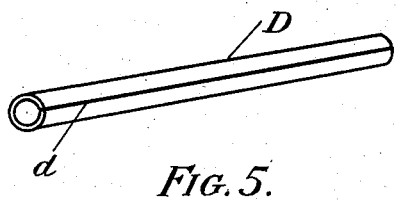
Figure 3:
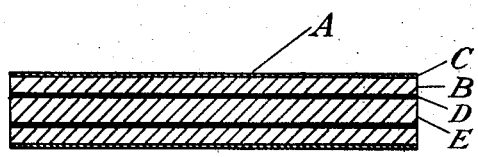
Figure 6:
Figure 7:
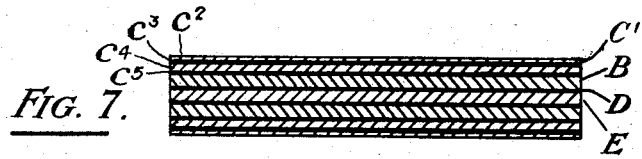
Figure 8:
Figure 9:
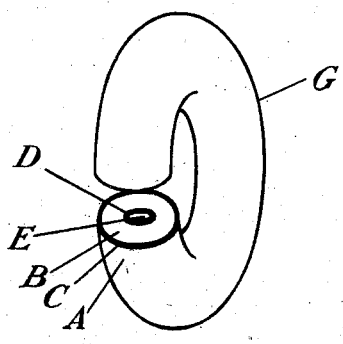

In the accompanying drawings which form a part of this specification Figure 1 is a side elevation of the ingot from which my wire is reduced, Figs. 2 and 3, transverse and longitudinal sections respectively of the same, Figs. 4 and 5 perspective views of two forms of my solder tube, Fig. 6, a like view of the central core, Fig. 7, a longitudinal section of a double plated ingot, Fig. 8, a side elevation of a length of my novel wire, and Fig. 9, a perspective view of a chain link bent up from a length of wire before uniting its abutting ends.

In order that the composition of my wire may be more thoroughly understood a description of the ingot from which my wire is drawn will first be given. In Figs. 1, 2, and 3 is shown the ingot A comprising a hollow core B of base metal or composition surrounded by its precious metal plating skin or shell C engaged thereon frictionally or by a film of solder applied in any usual well known manner, such for instance, as shown in United States Patents No. 294,722 or No. 445,814. The plating shell or skin may be compound as shown at $C'$ in Fig. 7, in which case I prefer to unite the compound shell and core as set forth in United States Patent No. 618,165. Within the core or body B is a tube of solder D which in detail is as shown in Fig. 4, or it may have a longitudinal slit as shown at $d$ in Fig. 5. Within the tube D is a central core E of brass or other non-fusible metal. This ingot is then reduced in diameter to wire form as shown in Fig. 8, in which form the described layers or elements C, B, D, and E, while of less diameter and greater length than before reduction, are otherwise as when in ingot form.

In Fig. 7, E is the ingot core; D, the solder tube; B, the body; and $C'$ the compound shell comprising the outer skin of precious metal $c^2$, solder $c^3$, base metal $c^4$, and hard solder $c^5$. The wire A may now be cut into desired lengths and be bent to form the link G shown in Fig. 9, whose end faces are particularly adapted to receive the flow of solder when the link is subjected to heat.

It will be observed that by the use of the solder tube D intermediate the members B and E the solder is thus uniform and continuous throughout every part of the wire, so that no solderless intervals occur. Furthermore the end face of the core E furnishes a supplementary area to accommodate the solder, and that such area is remote from the periphery of the wire.

What I claim is,—

A wire comprising a base metal tube, a precious metal shell upon the tube, a disconnected tube of solder within the base metal tube, and a core within the solder tube.

In testimony whereof I have affixed my signature in presence of two witnesses.

THOMAS F. CARLISLE.

Witnesses:
 WILLIAM H. POTTS,
 JAMES M. TISDALE.